United States Patent
Rosman et al.

(10) Patent No.: US 10,262,428 B2
(45) Date of Patent: Apr. 16, 2019

(54) SYSTEM AND METHOD FOR ADAPTIVE RANGE 3D SCANNING

(71) Applicant: Massachusetts Institute of Technology, Cambridge, MA (US)

(72) Inventors: Guy Rosman, Newton, MA (US); Daniela Rus, Weston, MA (US); John W. Fisher, III, Chestnut Hill, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 48 days.

(21) Appl. No.: 15/482,375

(22) Filed: Apr. 7, 2017

(65) Prior Publication Data

US 2018/0293746 A1     Oct. 11, 2018

(51) Int. Cl.
| | | |
|---|---|---|
| *G06T 7/521* | (2017.01) | |
| *G01B 11/25* | (2006.01) | |
| *G06K 9/20* | (2006.01) | |
| *G06T 17/05* | (2011.01) | |

(52) U.S. Cl.
CPC .......... *G06T 7/521* (2017.01); *G01B 11/2518* (2013.01); *G06K 9/2036* (2013.01); *G06T 17/05* (2013.01); *G06K 2209/40* (2013.01)

(58) Field of Classification Search
CPC .. G06T 7/50; G06T 7/521; G06T 7/55; G06T 7/97; G06K 9/2036; G06K 2209/041; G01B 11/25; G01B 11/2513; G01B 11/2518; G01B 11/2536
See application file for complete search history.

(56) References Cited

U.S. PATENT DOCUMENTS

| | | | |
|---|---|---|---|
| 8,837,026 B2 | 9/2014 | Fisker et al. | ............ G06T 17/00 |
| 2007/0065002 A1 | 3/2007 | Marzell et al. | ................ 382/154 |
| 2007/0091174 A1* | 4/2007 | Kochi et al. | ....... G01B 11/2509 348/135 |
| 2015/0022644 A1 | 1/2015 | Appia | ................ H04N 13/0271 |
| 2015/0204662 A1* | 7/2015 | Kobayashi et al. | ... G01B 11/25 356/610 |

OTHER PUBLICATIONS

Matter and Form 3D Scanner User Manual, Copyright © 2015 Matter and Form Inc., (86 pages).
Robert J. Zawadzki, et al; "Adaptive-optics optical coherence tomography for high-resolution and high-speed 3D retinal in vivo imaging"; Oct. 17, 2001 / vol. 13, No. 21 / Optics Express 8532.
Philipp Fechteler and Peter Eisert; "Adaptive Colour Classification for Structured Light Systems"; IET Digital Library; vol. 3, Issue 2, Jun. 2009, p. 49-59.

(Continued)

*Primary Examiner* — Andrew W Johns
(74) *Attorney, Agent, or Firm* — Peter A. Nieves; Sheehan Phinney Bass & Green PA

(57) ABSTRACT

A scanner system is configured for acquiring three dimensional image information of an object. The scanner includes a projector, a camera, a graphics processing device, and a processor. The projector projects one of several pre-defined patterns upon the object. The camera captures an image from the object, which is received by the processor. The processor approximates mutual information from the object and the pattern using the graphics processing device, and selects a second pattern for projecting on the object.

20 Claims, 4 Drawing Sheets

(56) References Cited

OTHER PUBLICATIONS

Yueyi Zhang, et al; "Robust depth sensing with adaptive structured light illumination"; Journal of Visual Communication and Image Representation; vol. 25, Issue 4, May 2014, pp. 649-658.

Xida Chen, et al; "Scene adaptive structured light using error detection and correction"; Pattern Recognition, vol. 18, Issue 1, Jan. 2015, pp. 220-230.

Olaf Hall-Holt, et al; Stripe Boundary Codes for Real-Time Structured-Light Range Scanning of Moving Objects; Conference: Computer Vision, 2001. ICCV 2001. Proceedings. Eighth IEEE International Conference on, vol. 2.

T.P. Koninckx, et al ; Real-time range acquisition by adaptive structured light; IEEE Transactions on Pattern Analysis and Machine Intelligence, vol. 28: issue 3, Mar. 2006.

\* cited by examiner

SYSTEM AND METHOD FOR ADAPTIVE RANGE 3D SCANNING

GOVERNMENT LICENSE RIGHTS

This invention was made with Government support under Grant No. W911NF-11-1-0391 awarded by the Army Research Office, under Grant Nos. N00014-12-1-1000 and N00014-09-1-1051 awarded by the Office of Naval Research, and under Grant No. DE-NA0002534 awarded by the Department of Energy. The Government has certain rights in the invention.

FIELD OF THE INVENTION

The present invention relates to imaging technology, and more particularly, is related to three dimensional scanners.

BACKGROUND OF THE INVENTION

Range sensors have revolutionized computer vision in recent years, with commodity red green blue-depth/distance (RGB-D) scanners providing solutions to challenging problems such as articulated pose estimation, Simultaneous Localization and Mapping (SLAM), and object recognition. The use of 3D sensors often relies on a simplified model of the resulting depth images that is loosely coupled to the photometric principles behind the design of the scanner. Given this intermediate representation, computer vision algorithms have been deployed to understand the world and take actions based on the acquired scene information.

Significant efforts have been devoted to optimal planning of sensor deployment under resource constraints on energy, time, or computation. Sensor planning has been employed in many aspects of vision and robotics, including positioning of 3D sensors and cameras, as well as other active sensing problems, see for example. The goal is to focus sensing on the aspects of the environment or scene most relevant to a specific inference task. However, the same principles are generally not used to examine the operation of the 3D sensor itself. Therefore, there is a need in the industry to address these shortcomings.

SUMMARY OF THE INVENTION

Embodiments of the present invention provide an system and method for adaptive range 3D scanning. Briefly described, the present invention is directed to a scanner system for acquiring three dimensional image information of an object. The scanner includes a projector, a camera, a graphics processing device, and a processor. The projector projects one of several pre-defined patterns upon the object. The camera captures an image from the object. The processor and/or graphics processing device approximates mutual information in the image from the object and the pattern, and selects a second pattern for projecting on the object.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The components in the drawings are not necessarily to scale, emphasis instead being placed upon clearly illustrating the principles of the present invention. The drawings illustrate embodiments of the invention and, together with the description, serve to explain the principles of the invention.

DETAILED DESCRIPTION

Figure 1:
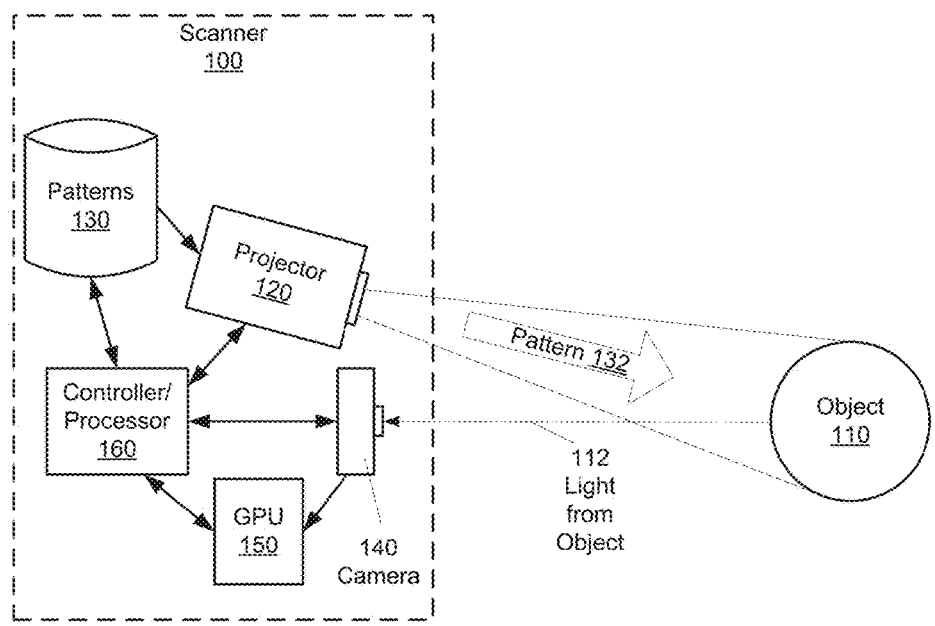
FIG. 1 is a schematic diagram of a first exemplary embodiment of a 3D scanner device according to the present invention.

The following definitions are useful for interpreting terms applied to features of the embodiments disclosed herein, and are meant only to define elements within the disclosure.

As used within this disclosure, "photometry" refers to the measurement of light in terms of its perceived brightness to the human eye. Photometry is distinct from radiometry, which refers to measurement of light in terms of absolute power.

As used within this disclosure, an "inference task" refers to a process of determining at least one identified type of unknown information based on a set of known information.

As used within this disclosure, "pose" refers to a position of a scanner relative to an object being scanned. Unless otherwise specified, a pose may be assumed to be static.

As used within this disclosure, "pose estimation" refers to compensation for a change in pose of the scanner.

As used within this disclosure, "mutual information (MI)" refers to commonality between the image and a relative set, for example, the pose or a 3D map, used to determine what is known about an object based upon observations of the object as a function of a pattern projected upon the object. In probability theory and information theory, the mutual information of two random variables is a measure of the mutual dependence between the two variables. More specifically, MI quantifies an amount of information, for example in units such as bits, obtained about one random variable, through another random variable. The concept of mutual information may be associated with the entropy of a random variable that defines the amount of information held in a random variable.

As used within this disclosure, an "optimal selection" refers to a broad choice of items, for example, projection patterns, used to collect information during an information gathering procedure. In general, an optimal selection may be used when the nature of the information to be gathered is unspecified, leading to a broad range of results from the information gathering procedure. An emphasis of optimal selection may relate to inference/estimation stages obtained from measurements or collected images. Inference/estimation may be thought of as a type of information gathering.

As used within this disclosure, a "greedy selection" refers to a selection of items, for example, projection patterns, based on information previously gathered and/or an identified type information desired to be gathered based on the selection. In general, greedy selection is used to reduce a selection set size from a general or optimal selection. A greedy selection may be used to leverage a short term horizon, where the criteria for a subsequent greedy selection may be affected/amended based upon the results of a previous selection. In general a greedy selection is performed an item at a time or a few items at the time, rather than over a complete horizon.

As used within this disclosure, "horizon" refers to a window of time in the future measured according to an image capturing process, for example, measured by a number of frames into the future.

As used within this disclosure, "albedo" refers to a measure for reflectance or optical brightness. Albedo is generally dimensionless and measured on a scale from zero (corresponding to a black body that absorbs all incident radiation) to one (corresponding to a white body that reflects all incident radiation).

As used within this disclosure, "world state" refers to the current status of several scanner system parameters, for example, the pose of the scanner, the map of the world and the state of the range image (the range distance of all points in the structure). The world state generally defines the scope of the variables used to assess an imaging scenario.

As used within this disclosure, a "graphics processing device" refers to a hardware processor adapted to process graphical content. The graphics processing device may be implemented as a specialized processor, or with other hardware implementations, for example, but not limited to, a graphical processing unit (GPU), an FPGA an ASIC, or a combination of these and/or other components. The graphics processing device need not be restricted to graphical processing tasks. Instead, any efficient/parallel processing device may be used as the graphics processing device.

As used within this disclosure, "servoing" refers to visual servoing, which is the estimation of the pose of a robot/camera from changes in a video feed.

Reference will now be made in detail to embodiments of the present invention, examples of which are illustrated in the accompanying drawings. Wherever possible, the same reference numbers are used in the drawings and the description to refer to the same or like parts.

As mentioned in the background section, sensor planning has been employed in many aspects of vision and robotics, including positioning of 3D sensors and cameras, as well as other active sensing problems, see for example. However, the same principles are generally not used to examine the operation of the 3D sensor itself. At a finer scale, each acquisition by a photosensitive sensor is a measurement, and the parameters of the sensors, including any active illumination, are an action parameter (in the decision-theoretic sense) to be optimized and planned.

FIG. 1 is a schematic diagram of a first exemplary embodiment of a three dimensional (3D) scanner 100 according to the present invention. The scanner 100 may be used to acquire 3D image information of an object 110 from a series of two dimensional images. A projector 120 is configured to project a pattern 132 selected from a plurality of pre-defined patterns 130 upon the object 110. The projector 120 may be any projector that allows different patterns to be projected over time, such as a DLP projector, for example the projector found in a Texas Instruments Light-Crafter 3000. A camera 140 receives light 112 from the object 110, for example, a combination of the reflected pattern 132 and other reflected light, such as reflected ambient light, and forms an image. The camera 140 may be any camera that may be triggered to capture timed images, for example a PointGrey Grasshopper II camera. A graphics processing device, for example, a graphical processing unit (GPU) 150, receives image information from the camera 140. A controller/processor 160 may be in communication with and/or control operation of the projector 120, the camera 140 and/or the GPU 150.

Figure 2:
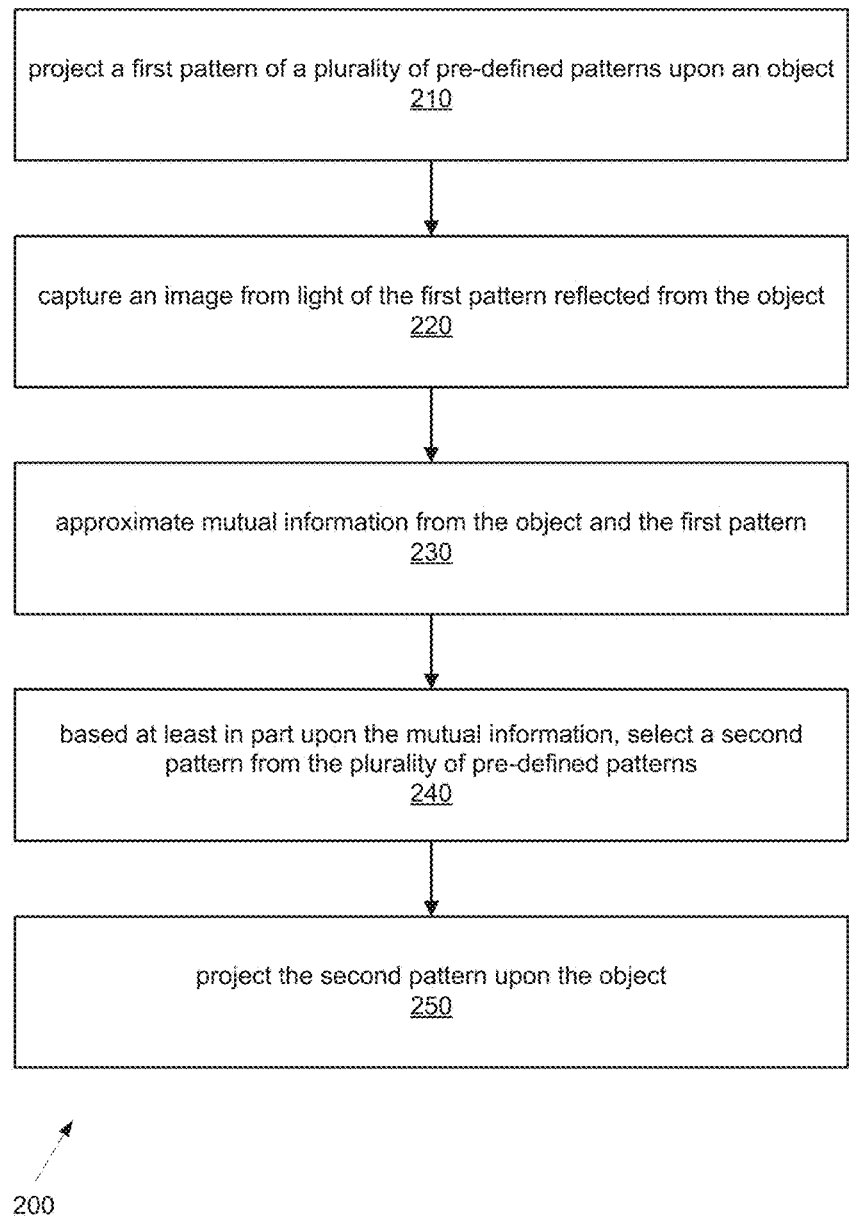
FIG. 2 is a flowchart of an exemplary embodiment of a method for obtaining 3D information about the object using the scanner of FIG. 1.

FIG. 2 is a flowchart of an exemplary embodiment of a method for obtaining 3D information about the object 110 using the scanner 100. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

The controller/processor 160 may be configured to control the projector 120 to project a first pattern 132 from the plurality of pre-defined patterns 130 upon the object 110, as shown by block 210. The camera 140 captures an image of the object 110 of light 112 from the object 110, as shown by block 220, including light of the first pattern reflected from the object and other light, such as reflected ambient light, or light from other light sources. The image is received by the GPU 150 and/or the controller/processor 160, and the GPU 150 and/or the controller/processor 160 approximates mutual information from the object 110 and the first pattern 132, as shown by block 230. A second pattern is selected from the plurality of patterns 130 based at least in part on the mutual information, as shown by block 240. Other factors for selecting the second pattern may include task-specific information regarding a functional usage of the compiled 3D information. The projector 120 projects the second pattern upon the object 110, as shown by block 250. Subsequent patterns may be similarly selected based upon estimate information on the world using previously collected patterns as per updated mutual information gain gathered from each projected pattern and associated collected image.

The exemplary embodiments of an adaptive range scanner described herein formulate an adaptive selection of patterns 130 in structured-light scanners in the context of a resource constrained system, treating the choice of the projected pattern at each time an image is collected as a planning choice, and the number of projected patterns as a resource. In this way the number of projected patterns may be reduced while the task-specific information is increased. The embodiments determine information gain from the predicted observation of the scene given previous observations and propose a new projected pattern, so the next projected pattern may be selected in an online fashion, wherein after each pattern is selected, the subsequent pattern is selected after the next projection and/or model update, corresponding to the greedy selection regime in sensor selection.

Figure 3:
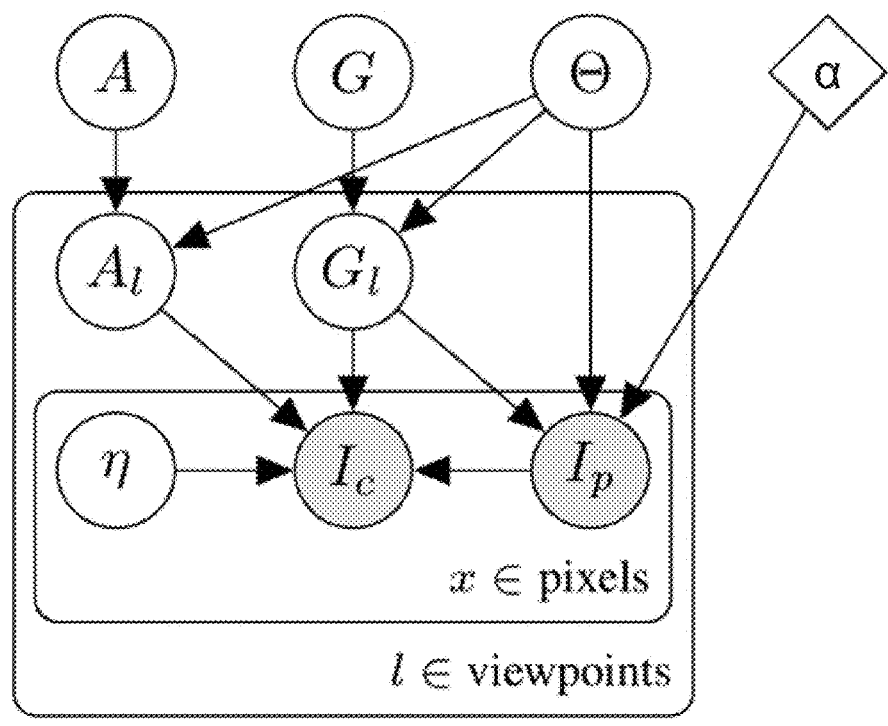
FIG. 3 is a diagram showing a probabilistic generative graphical model for the 3D scanning process employed by the scanner of FIG. 1.

The exemplary embodiments include a probabilistic generative graphical model for a 3D scanning process, depicted in FIG. 3. The controller/processor 160 and/or GPU 150 may estimate mutual information between the observed images and variables in models for mutual information and/or pattern selection described further below. For example, the scanner 100 may employ greedy open-loop pattern selection for the projector for the task of range estimation, or the scanner 100 may determine which parts of the image are informative for the task of pose estimation.

Sensor planning is an instance of experimental design, studied in a variety of domains, including economics, medical decision making, robotics, and sensor networks. While many optimality criteria have been proposed, one commonly used criterion is information gain. It is well-known that selection problems have intractable combinatorial complexity. However, it has been shown that tractable greedy selection heuristics, combined with open-loop feedback control may yield desirable performance, due to the submodular property of conditional mutual information (MI). This assumes one can evaluate the information measure for the set of sensing choices, in the present context, patterns. The embodiments may compute pixel-wise mutual information, an efficient local approximation of the MI, rather than the mutual information between the full image and the parameters of interest.

The embodiments employ a new physics-based model for structured-light sensing that simultaneously lends itself to tractable information evaluation while producing superior empirical results in a real system. The embodiments characterize the informational utility of a given pattern (or class of patterns) in the face of varying relevant versus nuisance parameter choices. The embodiments take into account that the utility of a given structured-light pattern may change depending on the specific inference task. The embodiments exploit graphics hardware to efficiently estimate the information gain of a selected pattern and reason about the effect of the dependency structure in a probabilistic model.

The choice of parameterization for the latent variables in the model is important for efficient information gain estimation, as may be observed in the common tasks of range sensing and pose estimation. The two exemplary applications of Table 1 and Table 2, described further below, are used to demonstrate how a careful choice of the scene and scanner representation lends itself to estimation of conditional mutual information.

The embodiments employ good inference and uncertainty estimation hinge to find scene parameterization that affords easy and efficient computation. Such a representation models the sensing process faithfully and is suited to inference and uncertainty estimation in several tasks. Within a single model, this ability may be achieved by inferring only a subset of variables, or computing the focused mutual information with respect to such a subset of variable.

The embodiments employ a framework for inference and uncertainty estimation in active illumination 3D scanners. In the field of structured-light reconstruction, several studies have suggested adaptive scanners and energy-efficient designs. However, unlike previous attempts that observed specific image features and addressed a specific pattern decoding technique, the embodiments use a generative model for the sensing process to obtain an adaptive scanner for various tasks, forming a decision-theoretic purposive 3D scanner.

FIG. 3 is a schematic diagram of a generative model 300 used for pattern selection and inferring depth in the first embodiment. The model 300 describes structured-light and time-of-flight imaging devices and standard cameras or camera-and-projector systems. Estimation of information gain is central to the method and thus impacts the choice of parameterization. The model 300 emphasize that approximations used by the embodiments for estimating information gain and choosing patterns generally do not carry over when computing the reconstruction. The model parameters may be roughly partitioned into agent pose, geometry of the scene, and photometry of the scene. The notation is summarized below:

A and G denote the photometric and geometric properties of the scene and are modeled as Gaussian per scene element.

Θ denotes the scanner/agent pose. It is distributed as a Gaussian in the Lie-algebra se. If range estimation is solely of interest, Θ is assumed to be fixed.

$A_l$, $G_l$ denote the view-dependent representations of the scene. They are not deterministic functions of A, G, Θ due to unmodeled aspects (occlusions). The geometry and pose determine camera and projector coordinates at each pixel.

$I_c$ and $I_p$ denote the camera and projector intensity values corrupted by additive per-pixel noise η(x). x denotes pixels in the camera image plane.

α denotes the pattern selection.

The generative graphical model of FIG. 3 depicts the relationships of the variables. Observations are denoted by the two lower right hand circles, latent variables by the other circles, and parameters by diamonds. As shown in FIG. 3, the model factorizes as $$p(A, G, \Theta, A_l, G_l, \eta, I_c, I_p; A) = \qquad (Eq.\ 1)$$
$$p(\Theta)p(A)p(G) \prod_l p(A_l | A, \Theta)p(G_l | G, \Theta)$$
$$\prod_{l,x} p(I_c | A_l, G_l, I_p, \eta)p(I_p | G_l, \Theta; A)p(\eta)$$

where the first line of FIG. 3 includes prior terms for the scene. The second line of FIG. 3 incorporates projection onto a specific viewpoint of the projector images and world model, and the last line of FIG. 3 involves sensor image rendering, and noise realization.

Note that depending on the inference task, various latent variables may alternate their roles as either relevant or nuisance. Patterns are preferably chosen to maximize focused information gains, information regarding the relevant set, rather than information of the non-relevant, or nuisance, variables. The notation of R⊆U denotes the relevant set, and U denotes the set of all nodes. Nuisance parameters have been considered in existing 3D reconstruction methods. Examples include the standard binarize-decode-reconstruct approach for time-multiplexed structured-light scanners or the choice of view-robust descriptors for 3D reconstruction from multiple views. The utility of the generative model is that nuisances may be addressed in a mathematically-consistent fashion.

The embodiments may incorporate several inference tasks of interest in 3D computer vision and the pattern selection issues which arise. For example, inference of $G_l$ given $I_c$, $I_p$, Θ amounts to 3D reconstruction, where $G_l$ is assumed to approximate G and $A_l$ is treated as a nuisance. Previous methods adopt a probabilistic model for improving structured-light reconstruction, but assume a predetermined set of patterns. Alternatively, Simultaneous Localization and Mapping (SLAM) methods incorporate inference steps for the geometry and pose parameters alternating between pose (Θ) updates conditioned on the geometry ($G_l$) and vice-versa. Updates to the 3D map may be posed as inference of G given $G_l$, Θ. In all cases, limiting assumptions regarding occlusions, the relation of appearance parameters and 3D geometry, and the relation between different range scans of the same scene are typically invoked.

For structured-light acquisition, one can associate pixels in $I_c$ and $I_p$ given the range r at each pixel x (which is a choice for $G_l$) and the pose Θ. The set of pixels in $I_p$ are by back-projecting x into the 3D world and projecting it into the projector image plane. The relation between the intensity values of these pixels can be given as $$I_C(x) = a(x) I_P(\Pi_{r,\theta}(x)) + b(x) + \eta(x) \qquad (Eq. 2),$$

where a, b depend on the ambient light, normals, and albedo of the incident surface. For sufficiently large photon count, η is assumed Gaussian accounting for sensor noise and unmodeled phenomena such as occlusions and non-Lambertian lighting components. Utilizing time-multiplexed structured-light, plane-sweeping enables efficient inference of $G_l$ from $I_c$, $I_p$, and incorporation of priors on the scene structure G. For purposes of this disclosure, a fixed pose and limiting the inference to estimation of $G_l$ may be assumed.

The embodiments efficiently compute the relevant mutual information quantities for different definitions of relevant set R, and choices from the set α, alternately considering Θ, G, and A as the relevant variable set. Nonlinear correspondence operators (back-projection and projection) linking $I_c$, $I_p$ complicate dependency analysis within the model and preclude analytic forms. The embodiments may implement the graphics processing device with common graphics hardware (such as a GPU, for example, but not limited to a Nvidia Titan X card) for a straightforward and efficient sampling approach that follows the generative model.

Within the 3D scanner, the interplay of photometric models and the reconstruction may lead to improved results and warrants examination. In Eq. 2, coefficients a and b capture illumination variability. A slightly more detailed description of the photometric model, shown in Eq. 3, $$I_c = \rho \frac{1}{r_p(x)^2} \langle n(x), l \rangle I_p(\pi_r(x)) + \rho I_{amb} \qquad (Eq. 3)$$

illustrates the contributions of the different factors. Here, ρ is the albedo coefficient, n(x) is the surface normal at a given image location x, l is the projector direction, and $I_{amb}$ is the ambient lighting. $r_p$ is the distance from the projector, and $I_p(\pi_r(x))$ is the projector intensity, assumed pixel-wise independent. Observing the pixel intensity entropy associated with different simplifications of this model provides insight on the relative importance of various factors and further provides some bounds on how much information can be gained from modification of the patterns. Specifically, the difference in image entropy between an arbitrary independently and identically distributed (i.i.d). pattern, and a deterministic pattern that deforms according to the geometry provides a bound on the maximum information gain.

Two exemplary cases of estimating mutual information gain for pattern selection in structured-light scanners are presented here. In each, inference over different subsets of variables are considered, and the mutual information between them and the observed images. Differing assumptions on the fixed/inferred variables and dependency structure in the image formation model lead to different processes for MI estimation given in Table 1 and Table 2 (below).

Given the pose, range measurements and camera image pixel values may be approximated as an independent estimation problem per-pixel, modeled here as the effect of surface self-occlusions as noise. This provides an efficient and parallelizable estimation procedure for the case of range estimation. This assumption may be exploited in plane-sweeping stereo, and is here utilized for MI estimation. Even where the inter-pixel dependency is not negligible, an upper bound may be computed for the information gain. For example, the case of pose and range estimation may be represented as:

$$I(I_c; \Theta, r) = \qquad (Eq. 4)$$

$$H(I_c) - H(I_c \mid \Theta, r) \leq \sum_x H(I_c^x) - \sum_x H(I_c^{(x)} \mid \Theta, r) \mathbb{I}(I_c; \Theta),$$

where $\mathbb{I}$ is the pixel-wise mutual information between the sensor and the inferred parameter.

The first case demonstrates estimating mutual information between the scene geometry and the observed images given a known set of illumination patterns. Here, inference is over $G_l$ as represented by the range at each camera pixel r=r(x). A Gaussian prior is assumed for a and b.

The pixel-wise mutual information may be computed individually and the results summed. This assumes a deterministic choice of pose. Unless otherwise stated the patterns discussed herein may be assumed to be deterministic, and are hence omitted from the notation for I. The mutual information between $I_c$ and $G_l$ given θ, $I_p$ may be given by $$\mathbb{I}(I_c; G_l \mid \theta) = \sum_x I(I_c(x); r(x) \mid \theta) = \sum_x E_{I_c, r \mid \theta}\left[\left(\log \frac{p(I_c \mid r, \theta)}{p(I_c \mid \theta)}\right)\right]. \qquad (Eq. 5)$$

While computing $p(I_c \mid r, \theta)$ is generally straightforward, the estimate $p(I_c \mid \theta)$, may be done by marginalizing over r according to posterior estimates, $$p(I_c \mid \theta) = E_r[p(I_c \mid r, \theta)] \qquad (Eq. 6)$$

For each sample of θ, r, the log of the likelihoods ratio may be computed and integrated. Other alternatives for efficient implementation include Gaussian Mixture Models (GMMs) or Laplace approximations. In a similar fashion, once the model is sampled, other quantities may be used such as the reduction in pixel-wise variance of a relevant set of variables, their standard deviations, or their entropy, as would be understood by a person having ordinary skill in the art. One sampling loop may be performed to estimate $p(I_c \mid \theta)$. Another set of samples may be used to estimate $I(I_c; G_l \mid \theta)$. Table 1 presents exemplary computation of the MI gain for frame T.

Since a, b, $\eta^{(0 \cdots T)}$ are all are assumed to be Gaussian conditioned on r, $p(a,b,I_c^{(t)} \mid I_p^{(0 \cdots t)}, I_c^{(0 \cdots t-1)})$ is Gaussian. The probability distribution function (pdf) of a, b and $I_c^{(T)}$ may be computed given $I_p^{(0 \cdots T)}$ and $I_c^{(0 \cdots T-1)}$, by conditioning on each image t at a time, computing $p(a,b,I_c^t \mid I_c^{0 \cdots t-1})$ for each t=0 . . . T iteratively. This allows fast computation on parallel hardware such as graphics processing units (GPUs), without explicit matrix inversion or other costly operations at each kernel.

TABLE 1

Pixel-wise mutual information estimation for range image estimation

1:     for pattern p, in each pixel x do
2:         for samples i = 1, 2, . . . , $N_{hist}$ do
3:             Sample a range value for x according to p(r).
4:             Raytrace $I_p$, sample $I_c$. Compute the statistics of a, b, $I_c$ conditioned on previous image measurements.
5:             Compute probability $p(I_c \mid r)$.
6:             Update the estimated per-pixel histogram, $p(I_c)$.

TABLE 1-continued

Pixel-wise mutual information estimation for range image estimation

7:     end for
8:     for samples i = 1, 2, . . . , $N_{MI}$ do
9:         Draw a new range value for x according to a proposal distribution p(r).
10:        Raytrace $I_p$, sample $I_c$. Compute the statistics of a, b, $I_c$ conditioned on previous image measurements.
11:        Compute probability $p(I_c|r)$, estimate $$\log\left(\frac{p(I_c|r)}{p(I_c)}\right).$$

12:        Update the estimated mutual information.
13:    end for
14: end for
15: Pick pattern p with maximum MI sum over the image

TABLE 2

Pixel-wise mutual information estimation for pose estimation

1:  for pattern p, in each pixel x do
2:      for samples i = 1, 2, . . . , $N_{hist}$ do
3:          Draw pose sample $\theta_i$, compute $T_{\theta_i}$
4:          for each sampled range value r(x) do
5:              Back-project $x^3$, compute $\bar{x}^3 = T_{\theta_i}(x)$.
6:              Project $\bar{x}^3$ and sample $I_p^{1...t}$, sample $I_c^{1...(t-1)}$.
7:              Compute the statistics of a, b, $I_c^{(t)}$ conditioned on previous image measurements and r sample.
8:              Update the estimated per-pixel histogram, $P(I_c)$
9:          end for
10:     end for
11:     for samples i = 1, 2, . . . , $N_{MI}$ do
12:         Draw pose sample $\theta_i$ and associated transformation $T_{\theta_i}$
13:         for each sampled range value r(x) do
14:             Back-project $x^3$, compute $\bar{x}^3 = T_{\theta_i}(x)$.
15:             Project $\bar{x}^3$ and sample $I_p^{1...t}$, sample $I_c^{1...(t-1)}$.
16:             Compute a, b, $I_c^{(t)}$ estimates conditioned on previous image measurements, and r sample.
17:             Estimate $\log\left(\frac{P(I_c|a, b, I_p, T_{\theta_i})}{P(I_c)}\right)$.
18:             Update the mutual information gain estimate.
19:         end for
20:     end for
21: end for
22: Pick pattern p with maximum MI sum over the image.

The second case shown by Table 2 is typical of pose estimation problems, inferring a low-dimensionality latent variable set with global influence, in addition to range uncertainty. In 3D pose estimation, $\Theta$ is usually estimated given a model of the world G. In visual SLAM, G, A, $A_I$ are commonly used to infer $\Theta$, $G_I$, either as online inference, or in batch-mode, where usually a specific function of the input (feature locations from different frames, or correspondence estimates) is taken. In depth-sensor based SLAM, the range sensors obtain a measurement $G_I$ under some active illumination. $\Theta$ is then approximated from G, $G_I$.

Table 2 describes computation of the MI between the pose and the images. As before, Gl is parameterized by r(x), and given $(\Theta, r)$ correspondence is re-established between Ip and Ic. This is done by computing a back-projected point $x_j^3$ (denoting it is a 3D point), transforming it according to $\Theta$ to get $\bar{x}_j^3$, and projecting $\bar{x}_j^3$ onto the camera and projector image. A similar situation would arise where inferring a class variable, where instead of merely inferring $\Theta$ a categorical variable C is also inferred that determines the class of the observed object. The following is observed: (i) given the pose parameters, the problem can still be approximated as a per-pixel process—this assumption underlies most visual servoing approaches. (ii) the pose parameter space is low-dimensional and can be sampled from, as is often done in particle filters for pose estimation. This procedure is detailed in Table 2 When computing $p(Ic(x)|\Theta)$, $p(\Theta)$ can be conditioned on previous observations, and sampled from the current uncertainty estimate for the pose and range.

When sampling the pose, different variants of the range images can be used, allowing marginalization with respect to range uncertainty as well. When sampling a conditioned image model per pixel, collisions in the projected pixels can occur. While these can be arbitrated using atomic operations on the GPU, the semantics of write hazards on GPUs are such that invalid pixel states can be avoided. Furthermore, to allow efficient computation on the GPU, memory access patterns may be considered. The exemplary embodiments may compute a proposal image statistics given $\theta$, and then aggregate the contribution into the accumulators for the mutual information per pixel.

Categorical variables may be incorporated in a similar fashion, to including object classes as part of $\Theta$. This involves changing lines 4,14, in Table 2 to sample a distribution over $\bar{x}_j^3(\theta,C,r)$ instead of $\bar{x}_j^3(\theta,r)$. This may provide for pattern selection for object classification tasks. While sampling the full space of appearance and range per-pixel is computationally expensive, running the process described above without any optimizations on a GPU has been demonstrated to take approximately one second on an Nvidia Quadro K2000.

Figure 4:
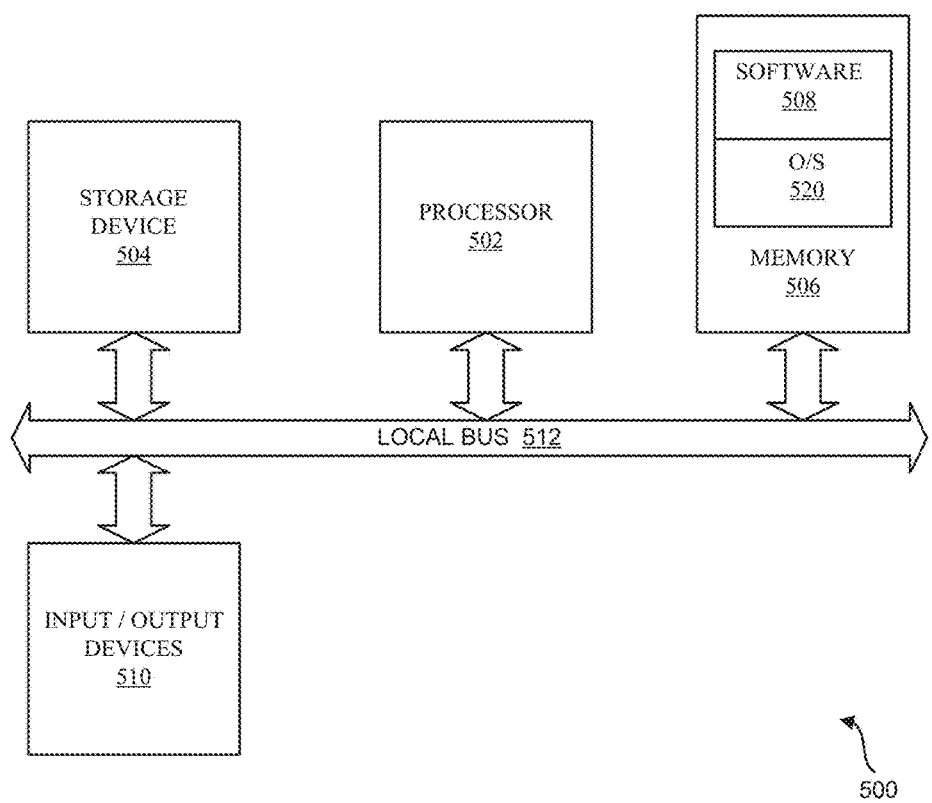
FIG. 4 is a schematic diagram illustrating an example of a system for executing functionality of the present invention.

The present system for executing the functionality described in detail above may include a computer, an example of which is shown in the schematic diagram of FIG. 4. The system 500 contains a processor 502, a storage device 504, a memory 506 having software 508 stored therein that defines the abovementioned functionality, input and output (I/O) devices 510 (or peripherals), and a local bus, or local interface 512 allowing for communication within the system 500. The local interface 512 can be, for example but not limited to, one or more buses or other wired or wireless connections, as is known in the art. The local interface 512 may have additional elements, which are omitted for simplicity, such as controllers, buffers (caches), drivers, repeaters, and receivers, to enable communications. Further, the local interface 512 may include address, control, and/or data connections to enable appropriate communications among the aforementioned components.

The processor 502 is a hardware device for executing software, particularly software including non-transient processor instructions stored in the memory 506. The processor 502 can be any custom made or commercially available single core or multi-core processor, a central processing unit (CPU), an auxiliary processor among several processors associated with the present system 500, a semiconductor based microprocessor (in the form of a microchip or chip set), a macroprocessor, or generally any device for executing software instructions.

The memory 506 can include any one or combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory 506 may incorporate electronic, magnetic, optical, and/or other types of storage media. Note that the memory 506 can have a distributed architecture, where various components are situated remotely from one another, but can be accessed by the processor 502.

The software 508 defines functionality performed by the system 500, in accordance with the present invention. The software 508 in the memory 506 may include one or more separate programs, each of which contains an ordered listing of executable instructions for implementing logical functions of the system 500, as described below. The memory 506 may contain an operating system (O/S) 520. The operating system essentially controls the execution of programs within the system 500 and provides scheduling, input-output control, file and data management, memory management, and communication control and related services.

The I/O devices 510 may include input devices, for example but not limited to, a keyboard, mouse, scanner, microphone, etc. Furthermore, the I/O devices 510 may also include output devices, for example but not limited to, a printer, display, etc. Finally, the I/O devices 510 may further include devices that communicate via both inputs and outputs, for instance but not limited to, a modulator/demodulator (modem; for accessing another device, system, or network), a radio frequency (RF) or other transceiver, a telephonic interface, a bridge, a router, or other device.

When the system 500 is in operation, the processor 502 is configured to execute the software 508 stored within the memory 506, to communicate data to and from the memory 506, and to generally control operations of the system 500 pursuant to the software 508, as explained above.

When the functionality of the system 500 is in operation, the processor 502 is configured to execute the software 508 stored within the memory 506, to communicate data to and from the memory 506, and to generally control operations of the system 500 pursuant to the software 508. The operating system 520 is read by the processor 502, perhaps buffered within the processor 502, and then executed.

When the system 500 is implemented in software 508, it should be noted that instructions for implementing the system 500 can be stored on any computer-readable medium for use by or in connection with any computer-related device, system, or method. Such a computer-readable medium may, in some embodiments, correspond to either or both the memory 506 or the storage device 504. In the context of this document, a computer-readable medium is an electronic, magnetic, optical, or other physical device or means that can contain or store a computer program for use by or in connection with a computer-related device, system, or method. Instructions for implementing the system can be embodied in any computer-readable medium for use by or in connection with the processor or other such instruction execution system, apparatus, or device. Although the processor 502 has been mentioned by way of example, such instruction execution system, apparatus, or device may, in some embodiments, be any computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the processor or other such instruction execution system, apparatus, or device.

Such a computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the system 500 is implemented in hardware, the system 500 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Other variations are possible within the scope of this disclosure. For example, selecting a projection pattern may be based at least in part upon information theoretic measures, and/or selecting the projection pattern may further be based upon quantification of uncertainty. For example, quantification of uncertainty may include entropy $$-\sum_i p(x_i)\log p(x_i), \quad \text{(Eq. 7)}$$

and/or renyi entropy $$\frac{1}{1-\alpha}\log\sum_i (x_i)^\alpha, \quad \text{(Eq. 8)}$$

where $x_i$ refers to values of the scene properties being estimated).

Similarly, selecting the projection pattern may be based at least in part upon quantification accuracy. For example, the quantification accuracy may include reconstruction error and/or variance $$\int (x-\bar{x})^2 p(x)dx \quad \text{(Eq 9)},$$

where x is any scene property value being estimated, and $\bar{x}$ denotes an estimated mean of the scene property value being estimated. Other variations are also possible.

The above embodiments demonstrate that the claimed invention may improve the operation of a 3D scanner, for example, by reducing the size of memory and complexity of computations as a result of operating with a reduced set of patterns.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A scanner system for acquiring three dimensional image information of an object comprising:
   a projector configured to project a pattern from a plurality of pre-defined patterns upon the object;
   a camera;
   a graphics processing device configured to process image information from the camera; and
   a processor and a memory configured to store non-transient instructions that, when executed by the processor and/or the graphics processing device, perform the steps of:
      projecting with the projector a first pattern from the plurality of pre-defined patterns upon the object;
      capturing, with the camera, an image from light of the first pattern reflected from the object;
      receiving the image from the camera;
      from the image, approximating mutual information from the object and the pattern;
      based at least in part upon the mutual information, selecting a second pattern from the plurality of pre-defined patterns; and
      projecting, with the projector, the second pattern on the object.

2. The system of claim 1, further comprising a controller configured to control an operation of the projector and/or the camera.

3. The system of claim 1, further comprising the step of:
   based at least in part upon the mutual information, updating a world state estimate of a 3D environment of the object comprising a scanner system pose.

4. The system of claim 3, wherein the world state estimate comprises at least one of the group consisting of a map, and a scanner pose.

5. The system of claim 3, wherein a specific aspect of the world state estimate comprises at least one of the group consisting of a map, a scanner pose, and a physical aspect of the object.

6. The system of claim 1, wherein selecting the second pattern further comprises determining mutual information based upon an identified inference task.

7. The system of claim 1, wherein selecting the second pattern is based at least in part by an identified inference task.

8. The system of claim 1, wherein approximating mutual information from the object and the pattern comprises determining pixel-wise mutual information.

9. The system of claim 1, wherein the graphics processing device comprises a graphical processing unit (GPU).

10. The system of claim 1, wherein selecting the second pattern may further be based upon information theoretic measures.

11. The system of claim 1, wherein selecting the second pattern may further be based upon quantification of uncertainty.

12. The system of claim 11, wherein quantification of uncertainty comprises entropy and/or renyi entropy.

13. The system of claim 1, wherein selecting the second pattern may further be based upon quantification accuracy.

14. The system of claim 13, wherein quantification accuracy further comprises reconstruction error and/or variance.

15. A method for acquiring three dimensional image information of an object with a scanner comprising the steps of:
   projecting with a first pattern from a plurality of pre-defined patterns upon the object;
   capturing an image from light of the first pattern reflected from the object;
   approximating mutual information from the object and the pattern;
   based at least in part upon the mutual information, selecting a second pattern from the plurality of pre-defined patterns; and
   projecting the second pattern on the object.

16. The method of claim 15, further comprising the step of based at least in part upon the mutual information, updating a world state estimate of a 3D environment of the object comprising a scanner system pose.

17. The method of claim 16, wherein the world state estimate comprises at least one of the group consisting of a map, and a scanner pose.

18. The method of claim 15, wherein selecting the second pattern further comprises determining mutual information based upon an identified inference task.

19. The method of claim 15, wherein approximating mutual information from the object and the pattern comprises determining pixel-wise mutual information.

20. The method of claim 15, wherein selecting the second pattern may further be based upon at least one of the group consisting of information theoretic measures, quantification of uncertainty, and quantification accuracy.

* * * * *